United States Patent
Liu et al.

(10) Patent No.: US 11,997,420 B2
(45) Date of Patent: May 28, 2024

(54) AUDIO AND VIDEO TRANSMISSION DEVICES AND AUDIO AND VIDEO TRANSMISSION SYSTEMS

(71) Applicant: SHENZHEN HOLLYLAND TECHNOLOGY CO., LTD., Guangdong (CN)

(72) Inventors: Dezhi Liu, Guangdong (CN); Qiang Ma, Guangdong (CN)

(73) Assignee: Shenzhen Hollyland Technology Co., Ltd., Guangdong (CN)

( * ) Notice: Subject to any disclaimer, the term of this patent is extended or adjusted under 35 U.S.C. 154(b) by 165 days.

(21) Appl. No.: 17/799,973

(22) PCT Filed: Feb. 25, 2020

(86) PCT No.: PCT/CN2020/076673
§ 371 (c)(1),
(2) Date: Aug. 16, 2022

(87) PCT Pub. No.: WO2021/164043
PCT Pub. Date: Aug. 26, 2021

(65) Prior Publication Data
US 2023/0078451 A1    Mar. 16, 2023

Related U.S. Application Data

(60) Provisional application No. 62/979,186, filed on Feb. 20, 2020.

(51) Int. Cl.
*H04N 7/04* (2006.01)
*G10L 19/16* (2013.01)
(Continued)

(52) U.S. Cl.
CPC ............. *H04N 7/04* (2013.01); *G10L 19/167* (2013.01); *H04N 5/265* (2013.01); *H04R 1/08* (2013.01);
(Continued)

(58) Field of Classification Search
CPC .......... H04N 7/04; H04N 5/265; H04N 19/00; G10L 19/167; H04R 1/08; H04R 3/00; H04R 2420/07; H04W 84/12
(Continued)

(56) References Cited

U.S. PATENT DOCUMENTS 5,561,468 A * 10/1996 Bryan .................. H04N 21/426
375/E7.277
5,940,070 A * 8/1999 Koo ....................... H04N 7/083
348/E7.028
(Continued)

FOREIGN PATENT DOCUMENTS

CN    105448146    3/2016
CN    107424617    12/2017

OTHER PUBLICATIONS

International Search Report and Written Opinion in International Appln. No. PCT/CN2020/076673, mailed on Oct. 16, 2020, 10 pages (with partial English translation).
(Continued)

*Primary Examiner* — Pritham D Prabhakher
(74) *Attorney, Agent, or Firm* — Fish & Richardson P.C.

(57) ABSTRACT

Audio and video transmission device and audio and video transmission system are provided. The audio and video transmission system includes an audio and video transmission device and at least one wireless microphone transmitting device. Each of the at least one wireless microphone transmitting device is configured to send an audio signal acquired by a wireless microphone to the audio and video
(Continued)

transmission device. The audio and video transmission device is configured to be respectively connected to the wireless microphone transmitting device and an external video acquisition device and configured to: receive the audio signal from the wireless microphone transmitting device and transmit the audio signal to the video acquisition device, obtain a mixture signal generated by the video acquisition device from the audio signal and a video signal, and process and output the mixture signal.

16 Claims, 4 Drawing Sheets

(51) Int. Cl.
    *H04N 5/265*     (2006.01)
    *H04N 19/00*     (2014.01)
    *H04R 1/08*     (2006.01)
    *H04R 3/00*     (2006.01)
    *H04W 84/12*     (2009.01)

(52) U.S. Cl.
    CPC ............... *H04R 3/00* (2013.01); *H04N 19/00* (2013.01); *H04R 2420/07* (2013.01); *H04W 84/12* (2013.01)

(58) Field of Classification Search
    USPC ...................................................... 348/222.1
    See application file for complete search history.

(56) References Cited

U.S. PATENT DOCUMENTS

| | | | | |
|---|---|---|---|---|
| 8,750,295 | B2* | 6/2014 | Liron | H04N 5/268 |
| | | | | 370/254 |
| 8,860,774 | B1* | 10/2014 | Sheeley | H04N 7/15 |
| | | | | 348/14.08 |
| 9,516,265 | B2* | 12/2016 | Durante | H04M 7/006 |
| 9,787,887 | B2* | 10/2017 | Boghosian | H04N 23/667 |
| 10,080,061 | B1* | 9/2018 | Kirley | H04N 21/4852 |
| 10,158,905 | B2* | 12/2018 | Lau | H04N 21/43615 |
| 2006/0055771 | A1* | 3/2006 | Kies | H04N 7/148 |
| | | | | 348/14.02 |
| 2010/0026905 | A1* | 2/2010 | Liron | H04N 5/268 |
| | | | | 348/E5.123 |
| 2014/0362171 | A1* | 12/2014 | Wall | H04N 7/147 |
| | | | | 348/14.12 |
| 2015/0208030 | A1* | 7/2015 | Durante | H04M 3/5231 |
| | | | | 348/14.01 |
| 2017/0019580 | A1 | 1/2017 | Boghosian et al. | |
| 2018/0026733 | A1* | 1/2018 | Yang | H04N 21/235 |
| | | | | 725/33 |
| 2018/0077443 | A1* | 3/2018 | Lau | H04N 21/2625 |
| 2019/0090028 | A1* | 3/2019 | Kirley | H04N 21/41265 |

OTHER PUBLICATIONS

Office Action in Chinese Appln. No.202020207915.0, dated May 29, 2020, 4 pages (with partial English translation).

* cited by examiner

AUDIO AND VIDEO TRANSMISSION DEVICES AND AUDIO AND VIDEO TRANSMISSION SYSTEMS

CROSS REFERENCE TO RELATED APPLICATIONS

This application is the national phase of International Application No. PCT/CN2020/076673 filed on Feb. 25, 2020, which claims the benefit of priority from U.S. Provisional Application No. 62/979,186 filed on Feb. 20, 2020, the entire contents of which are incorporated herein by reference.

TECHNICAL FIELD

The present disclosure relates to the field of communication technologies, and in particular to an audio and video transmission device and an audio and video transmission system.

BACKGROUND

In scenes such as film and television shooting, commercial video shooting and personal shooting, when performing video shooting on one or more photographed objects, it is necessary to simultaneously acquire a video signal of the one or more photographed objects and one or more audio signals that need to be played synchronously with the video signal, then perform synchronous alignment on the video signal and the one or more audio signals to obtain a final mixed audio and video signal, and transmit the mixed audio and video signal to a video receiving end. In general, when using a camera device to shoot a video, the video signal of the one or more photographed objects can be acquired by the camera device, and the one or more audio signals can be acquired by a microphone built in the camera device at the same time; and the mixed audio and video signal generated after synchronizing the video signal and the one or more audio signals can be sent to the video receiving end through a wireless transmission technology. However, the built-in microphone is only suitable for a scene where an audio signal source and the camera device are close to each other. If a distance between the audio signal source and the camera device is relatively far, an acquisition effect of the built-in microphone will be poor. In addition, a motor and a fan in the camera device will generate noise interference, the quality of the acquired audio signal cannot be guaranteed.

SUMMARY

Based on the above, the present disclosure provides an audio and video transmission system and an audio and video transmission device.

According to a first aspect of embodiments of the present disclosure, there is provided an audio and video transmission system, including: an audio and video transmission device and at least one wireless microphone transmitting device, wherein each of the at least one wireless microphone transmitting device is configured to send an audio signal acquired by a wireless microphone to the audio and video transmission device; and the audio and video transmission device is configured to be respectively connected to a video acquisition device being external to the audio and video transmission device and the wireless microphone transmitting device to receive the audio signal and transmit the audio signal to the video acquisition device, obtain a mixture signal generated by the video acquisition device from the audio signal and a video signal, and process and output the mixture signal.

According to a second aspect of the embodiments of the present disclosure, there is provided an audio and video transmission device, wherein the audio and video transmission device is configured to be respectively connected to a video acquisition device being external to the audio and video transmission device and a wireless microphone transmitting device, and the audio and video transmission device includes:

an audio transmission unit configured to receive an audio signal acquired by a wireless microphone from the wireless microphone transmitting device, and transmit the audio signal to the video acquisition device; and a video transmission unit configured to obtain and output a mixture signal generated by the video acquisition device from the audio signal and a video signal.

According to the embodiments of the present disclosure, a wireless microphone physically separated from a video acquisition device is used to acquire an audio signal of an audio signal source, the acquired audio signal is not directly transmitted to the video acquisition device by the wireless microphone, but is transmitted by an audio and video transmission system with a wireless microphone transmitting device and an audio and video transmission device. The audio signal is sent to the audio and video transmission device by the wireless microphone transmitting device, and then is transmitted to the video acquisition device by the audio and video transmission device. In order to utilize existing functions of the video acquisition device, when designing the present solution, the video acquisition device can still perform synchronization on the audio signal and a video signal to generate a mixed audio and video signal, and output the mixed audio and video signal to the audio and video transmission device, such that the audio and video transmission device can send the mixed audio and video signal to a video receiving end, therefore, there is no need to change the existing functions of the video acquisition device. According to the solution of the embodiments of the present disclosure, the acquisition of the audio signal in a shooting scene where a distance between the audio signal source and the video acquisition device is relatively far and the transmission of the audio signal and the mixed audio and video signal can be realized. By arranging the microphone at a position convenient for acquiring the audio signal source to acquire the audio signal, the quality of the acquired audio signal can be improved, thereby ensuring the effect of a final acquired audio and video. In addition, the transmission of the audio signal and the mixed audio and video signal can be realized at the same time through the self-designed audio and video transmission system, therefore, the problem of the transmission of the audio signal and the mixed audio and video signal in the shooting scene where the distance between the audio signal source and the video acquisition device is relatively far is solved; further, the transmission of two signals can be realized by one device, thereby simplifying the installation process of the device during shooting.

It should be understood that the above general descriptions and subsequent detailed descriptions are merely illustrative and explanatory, and shall not constitute limitation to the present disclosure.

BRIEF DESCRIPTION OF THE DRAWINGS

The accompanying drawings, which are incorporated in and constitute a part of this specification, illustrate examples consistent with the present disclosure and, together with the description, serve to explain the principles of the disclosure.

DETAILED DESCRIPTION OF THE EMBODIMENTS

Figure 1:
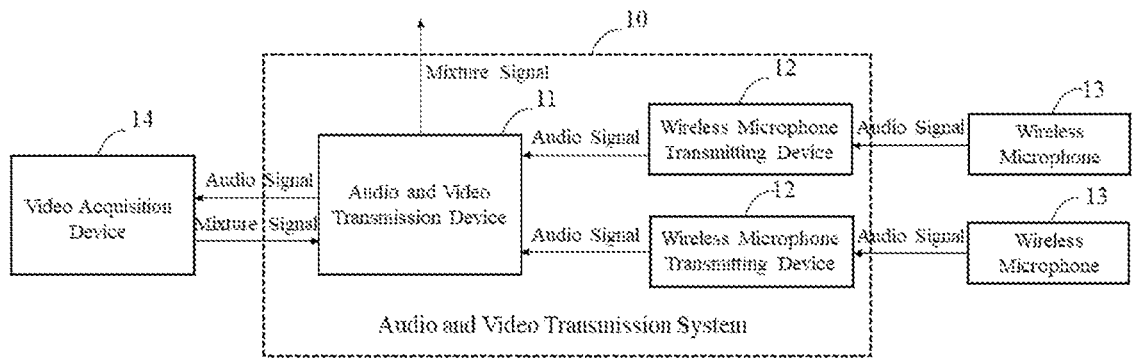
FIG. 1 is a schematic diagram illustrating an audio and video transmission system according to an embodiment of the present disclosure.

Exemplary embodiments will be described in detail here, examples of which are illustrated in the accompanying drawings. When the following description refers to the drawings, unless otherwise indicated, the same numerals in different drawings indicate the same or similar elements. The implementations set forth in the following description of exemplary embodiments do not represent all implementations consistent with the embodiments of the present disclosure. Instead, they are merely examples of apparatuses and methods consistent with aspects related to the embodiments of the present disclosure as recited in the appended claims.

Terms used in the embodiments of the present disclosure are only adopted for the purpose of describing specific embodiments and not intended to limit the embodiments of the present disclosure. The singular forms "a", "one" and "the" used in the present disclosure and the appended claims are also intended to include plural forms, unless the context clearly indicates other meanings. It should also be understood that the term "and/or" as used in the present disclosure refers to and includes any and all possible combinations of one or more of the associated listed items.

It should be understood that, although terms first, second, third and the like may be adopted to describe various information in the embodiments of the present disclosure, the information should not be limited to these terms. These terms are only configured to distinguish the same type of information. For example, first information may also be referred to as second information, and similarly, the second information may also be referred to as the first information without departing from the scope of the embodiments of the present disclosure. For example, terms "if" and "in case of" used herein may be explained as "while" or "when" or "responsive to determining", which depends on the context.

In scenes such as film and television shooting, commercial video shooting or personal shooting, a video signal can be acquired from one or more photographed objects and one or more audio signals can be acquired from an audio signal source at the same time through a camera device, and a mixed audio and video signal obtained after synchronizing the one or more audio signals and the video signal is output to a video receiving end. In some scenes, a distance between the video receiving end and the camera device is relatively far, therefore, the mixed audio and video signal acquired by the camera device can be sent to the video receiving end through a wireless transmission technology, so that a video can be viewed remotely at the video receiving end. At present, when using the camera device to acquire the one or more audio signals of the one or more photographed objects, a microphone built in the camera device is mostly used. This method is only suitable for a case where a distance between the camera device and the audio signal source is relatively close, however, when the distance between the camera device and the audio signal source is relatively far, the quality of the acquired audio signal is relatively poor, which will affect the playback effect.

Based on the above, the present disclosure provides an audio and video transmission device and an audio and video transmission system, which can realize the acquisition of an audio signal and the transmission of the audio signal and a mixed audio and video signal in a shooting scene where a distance between the audio signal source and the video acquisition device is relatively far.

As shown in FIG. 1, an audio and video transmission system 10 can include an audio and video transmission device 11 and a wireless microphone transmitting device 12. The number of the wireless microphone transmitting device 12 is not limited, and two wireless microphone transmitting devices 12 are shown in FIG. 1 as an example. One wireless microphone transmitting device 12 is configured to be connected to a wireless microphone 13 for sending an audio signal acquired by the wireless microphone 13 from an audio signal source to the audio and video transmission device 11. The audio and video transmission device 11 is also configured to be connected to a video acquisition device 14 for acquiring a video signal of one or more photographed objects. The audio and video transmission device 11 sends the audio signal received from the wireless microphone transmitting devices 12 to the video acquisition device 14, so that the video acquisition device 14 performs synchronization on the audio signal and the video signal of the one or more photographed objects to generate a mixed audio and video signal (hereinafter referred to as "mixture signal"), and outputs the mixture signal to the audio and video transmission device 11, so that the audio and video transmission device 11 outputs the mixture signal.

There may be various examples of the audio signal source. For example, the audio signal source may be the one or more photographed objects, or other sound sources (for example, a voice of a narrator who explains the video) that need to be played synchronously with a video of the one or more photographed objects, or the like.

In a long-distance shooting scene, the audio signal source is far away from the video acquisition device 14, if a microphone built in the video acquisition device 14 is used, a sound reception effect is relatively poor, and thus a wireless microphone 13 being external to the video acquisition device 14 (i.e., an external wireless microphone 13) is used in the present application. In order to acquire a clearer audio signal to improve the quality of the audio signal, the wireless microphone 13 can be arranged close to the audio signal source. For example, if the audio signal source is a video narrator, the wireless microphone 13 can be carried on a body of the narrator. For the convenience of carrying, the wireless microphone transmitting device 12 and the wireless microphone 13 can be designed as a whole piece, for example, the wireless microphone transmitting device 12 and the wireless microphone 13 can be designed as a hand-held type or a miniature integrated lavalier type. After acquiring the audio signal of the audio signal source, the wireless microphone 13 sends the audio signal to the audio and video transmission device 11 through the wireless microphone transmitting device 12. The wireless microphone transmitting device 12 can send the acquired audio signal to the audio and video transmission device 11 through various wireless transmission technologies, such as Bluetooth, WIFI and Zigbee. Considering a transmission distance and a transmission effect, in a shooting scene where a distance between the audio signal source and the video acquisition device 14 is relatively far, a WIFI transmission technology is usually used. For example, after the acquired audio signal is modulated by digital modulation, the modulated audio signal can be transmitted through 1.9 GHz digital enhanced cordless telecommunications digital enhanced cordless telecommunications (DECT), 2.4 GHz industrial scientific medical (ISM) or 5 GHz ISM band.

In general, in order to meet the requirement of live stereo or multi-channel sound reception, one audio and video transmission device 11 can be configured to be connected to at least two wireless microphone transmitting devices 12 at the same time, and each of the at least two wireless microphone transmitting devices 12 sends the audio signal acquired by the wireless microphone 13 being connected to the wireless microphone transmitting devices 12 to the audio and video transmission device 11. When one audio and video transmission device 11 is connected to a plurality of wireless microphone transmitting devices 12, a transmission method such as time division multiple access (TDMA) can be used. Different wireless microphone transmitting devices 12 occupy different time slots, and the plurality of wireless microphone transmitting devices 12 only occupy one independent wireless channel when performing data transmission with the audio and video transmission device 11.

The audio and video transmission device 11 and the video acquisition device 14 can be connected by way of a physical connection, or can also be connected by way of a wireless connection. In general, the audio and video transmission device 11 can be arranged close to the video acquisition device 14. For example, the video acquisition device 14 is designed with a physical interface connected to the audio and video transmission device 11, both of which can be connected through the physical interface. Certainly, in order to save space and facilitate the movement of the video acquisition device 14 and the audio and video transmission device 11 during shooting, the audio and video transmission device 11 can be fixed on the video acquisition device 14.

After receiving the audio signal sent by the wireless microphone transmitting device 12, the audio and video transmission device 11 can input the audio signal to the video acquisition device 14. The video acquisition device 14 performs synchronous alignment on the received audio signal and the acquired video signal to generate a mixture signal that uses the audio signal as accompanying audio of the video signal, and then outputs the mixture signal to the audio and video transmission device 11. The audio and video transmission device 11 processes and outputs the mixture signal. For example, in some embodiments, the audio and video transmission device 11 may have a component such as a display screen, and the audio and video transmission device 11 decodes and outputs the mixture signal to a display interface for a user to view.

In some embodiments, the audio and video transmission device 11 can also send the mixture signal to other video receiving ends, so that the user can view videos through the video receiving ends. For example, in many video shooting scenes, a director needs to remotely monitor the shooting effect, at this time, the mixture signal can be sent to a remote monitoring device, so that the director can monitor the shooting effect. In order to realize a long-distance transmission without wiring, the audio and video transmission device 11 can also output the mixture signal to the video receiving end through wireless transmission technologies such as Bluetooth, WIFI and Zigbee. Considering the shooting scene where the audio signal source is far away from the video acquisition device 14, the transmission distance may be relatively far, and the amount of video data is relatively large, therefore, the WIFI transmission can be used. For example, a general video compression encoding technology (for example, H.264/H.265) can be used to encode the mixture signal, and then a general WIFI transmission technology (for example, 2.4 GHz, 5 GHz unlicensed national information infrastructure (UNII) WIFI and 60 GHz 802.11d WIFI) can be used to transmit the mixture signal to the video receiving end. The video receiving end can be a smart terminal with a general WIFI connection function and a general H.264/H.265 video decoding capability, for example, personal terminals such as a mobile phone and a computer; or can also be an independent device with a stronger hardware H.264/H.265 decoding capability and a stronger wireless WIFI performance.

In the audio and video transmission system according to the embodiments of the present disclosure, the wireless microphone 13 acquires the audio signal of the audio signal source and sends the audio signal to the audio and video transmission device 11 through the wireless microphone transmitting device 12, the audio and video transmission device 11 inputs the audio signal to the video acquisition device 14, the video acquisition device 14 performs synchronization on the audio signal and the acquired video signal to generate a mixture signal, and then outputs the mixture signal to the audio and video transmission device 11; and the audio and video transmission device 11 outputs the mixture signal. By using the external wireless microphone 13 to acquire the audio signal of the audio signal source, the quality of the audio signal can be improved. By using the self-designed audio and video transmission device 11 to transmit the audio signal and input the audio signal to the video acquisition device 14, the synchronization of the audio signal and the video signal can be realized, and the mixed audio and video signal can be generated. In addition, the audio and video transmission device 11 can also transmit the mixture signal at the same time, i.e., the audio and video transmission device 11 can send the mixed audio and video signal to the video receiving end. By using one audio and video transmission device 11, the transmission of the audio signal and the mixed audio and video signal can be realized at the same time, which not only facilitates the installation of the device during shooting, but also solves the problem of the audio acquisition and transmission in the long-distance shooting scene, thereby improving the effect of the final acquired audio and video.

Figure 2:
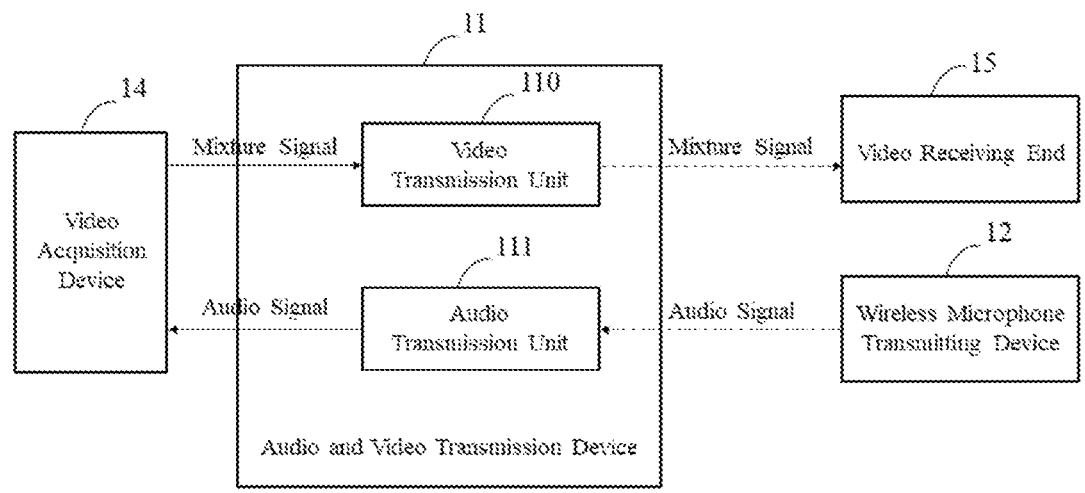
FIGS. 2-6 are schematic structural diagrams illustrating an audio and video transmission device according to an embodiment of the present disclosure.

As shown in FIG. 2, the audio and video transmission device 11 provided by the embodiments of the present disclosure can include a video transmission unit 110 and an audio transmission unit 11. The audio transmission unit 111 is configured to receive an audio signal transmitted by the wireless microphone transmitting device 12 through a wireless transmission channel, and transmit the audio signal to the video acquisition device 14. The video transmission unit 110 is configured to send a mixture signal generated after synchronizing the audio signal output by the video acquisition device 14 and a video signal to a video receiving end 15 through a wireless transmission channel.

Figure 3:
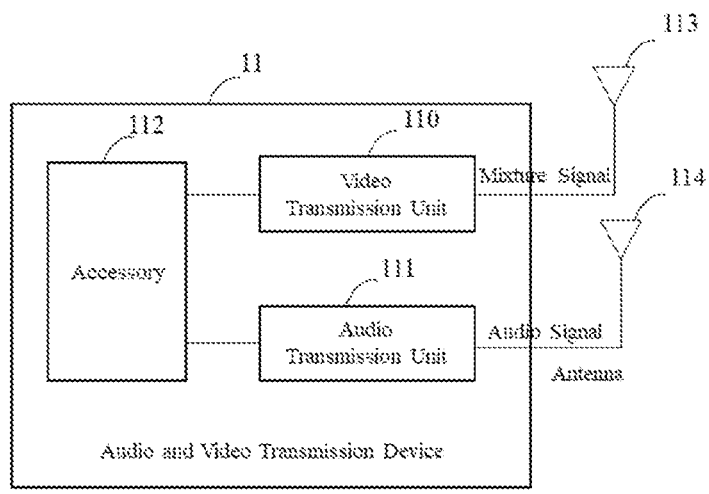
Figure 4:
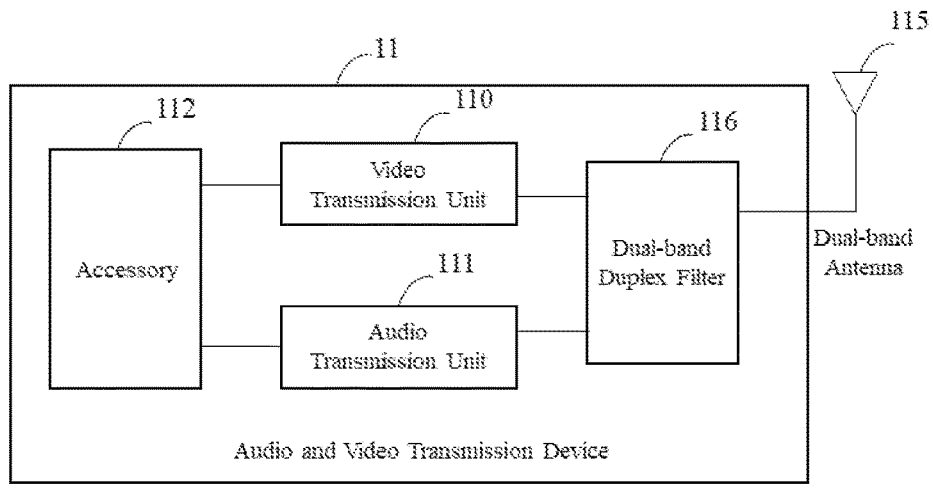

In some embodiments, the audio and video transmission device 11 can independently transmit the audio signal and the mixture signal. For example, as shown in FIG. 3, the audio and video transmission device 11 can include the video transmission unit 110, the audio transmission unit 111, an accessory 112 and multiple antennas (for example, 113 and 114 in FIG. 3). The accessory 112 can include a battery, a key, a display screen, a housing, and the like. The video transmission unit 110 and the audio transmission unit 111 respectively use independent wireless transmission channels and antennas, so that data can be transmitted through respective wireless transmission channels. For example, the audio transmission unit 111 can receive the audio signal sent by the wireless microphone transmitting device 12 through the antenna 114, and output the audio signal to the video acquisition device 14; the video transmission unit 110 obtains the mixture signal from the video acquisition device 14, and sends the mixture signal to the video receiving end 15 through the antenna 113. In order to avoid mutual interference caused by two kinds of signal transmission, video transmission unit 110 and the audio transmission unit 111 can be configured to work in different bands, for example, the video transmission unit 110 is configured to work in UNII 5 GHz WIFI, and the audio transmission unit 111 is configured to work in ultra-high frequency (UHF) or 2.4 GHz. Certainly, in some embodiments, as shown in FIG. 4, in order to reduce a number of the antennas, the audio and video transmission device 11 can further include a dual-band duplex filter 116 and a dual-band antenna 115, wherein a radio frequency combination can be realized by the dual-band duplex filter 116, and then the transmission can be performed by the dual-band antenna 115.

Certainly, since the audio signal and the mixture signal respectively use independent transmission channels, this not only occupies wireless transmission channel resources (for example, at least two wireless channels are occupied), but also causes the mutual interference of the transmission of the two signals. In order to reduce the occupation of the wireless transmission channel resources and the interference between two kinds of signal transmission, in some embodiments, the audio and video transmission device 11 can use a same wireless channel to transmit the audio signal and the mixture signal in a time division multiplexing manner, i.e., the audio signal and the mixture signal can use a unified wireless transmission technology such as a WIFI IEEE 802.11 transmission technology. Since the transmission of a wireless video signal needs a high bit stream bandwidth, but allows a relatively long time delay, while the transmission of a wireless microphone audio signal allows a low bit stream bandwidth, but has a relatively strict requirement on the delay, transmitting the two signals through the same wireless channel can not only benefits from characteristics of the wireless microphone audio signal such as occupying a relatively small bandwidth, having relatively low power consumption and delay parameters, but also satisfies the requirement of a high transmission bandwidth for the wireless video signal, therefore, respective requirements can be met. In addition, the audio signal and the mixture signal can be transmitted through 2.4 GHz, 5 GHz UNII, or 60 GHz ISM band, therefore, the requirement of a high rate bandwidth for the wireless video transmission can be ensured; further, 5 GHz UNII and 60 GHz ISM band with a relatively little interference can also provide a more reliable guarantee for the real-time transmission of the audio signal.

Figure 5:
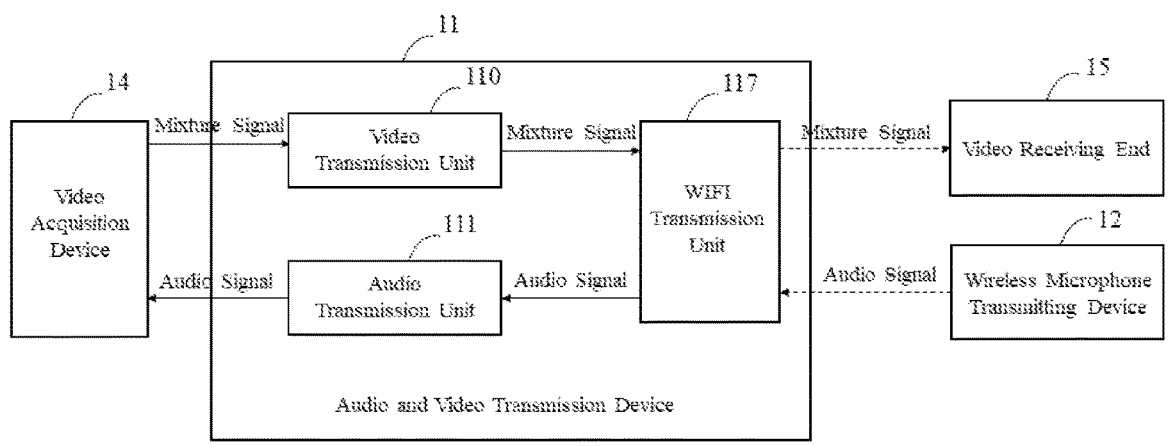

In some embodiments, both the audio signal and the mixture signal are transmitted by the WIFI transmission technology, and the two signals can share a WIFI transmission channel. As shown in FIG. 5, the audio and video transmission device 11 can further include a WIFI transmission unit 117. The video transmission unit 110 and the audio transmission unit 111 can share the WIFI transmission unit 117, wherein the audio transmission unit 111 receives the audio signal from the wireless microphone transmitting device 12 through the WIFI transmission unit 117, and the video transmission unit 110 sends the mixture signal to the video receiving end 15 through the WIFI transmission unit 117.

Figure 6:
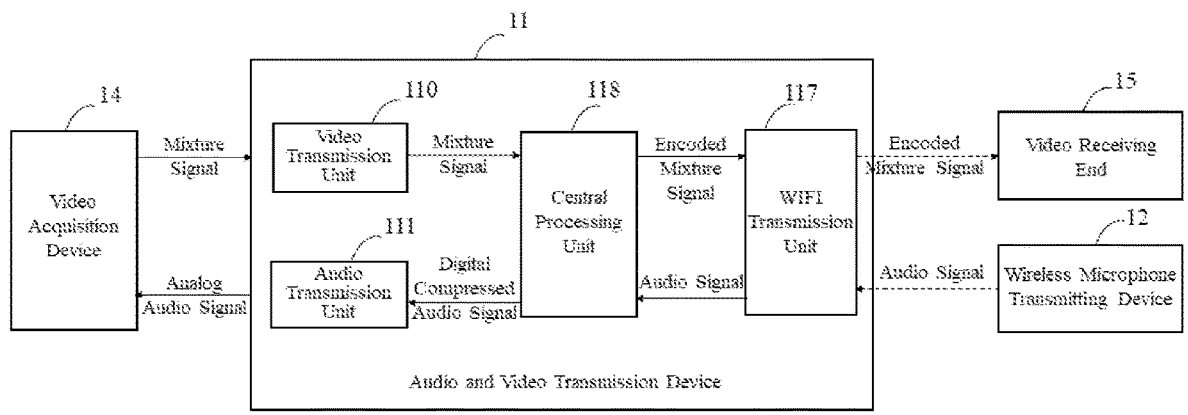

In some embodiments, as shown in FIG. 6, the audio and video transmission device 11 further includes a central processing unit 118 configured to receive the mixture signal from the video transmission unit 110, respectively perform compression encoding on the audio signal and the video signal in the mixture signal to obtain a compression encoded audio signal and a compression encoded video signal, output the compression encoded audio signal and the compression encoded video signal to the WIFI transmission unit 117, so that the WIFI transmission unit 117 transmits the compression encoded audio signal and the compression encoded video signal to the video receiving end 15, receive the audio signal sent by the wireless microphone transmitting device 12 from the WIFI transmission unit 117, convert the audio signal into a digital compressed audio signal, and send the digital compressed audio signal to the audio transmission unit 111. After receiving the audio signal from the wireless microphone transmitting device 12, the WIFI transmission unit 117 in the audio and video transmission device 11 can first send the audio signal to the central processing unit 118, the central processing unit 118 converts the audio signal into a digital compressed audio signal, wherein the digital compressed audio signal can be obtained by using an open source coding algorithm such as adaptive differential pulse code modulation (ADPCM) and Opus-CELT to encode the audio signal, and a format of the digital compressed audio signal is the same as that of the audio signal sent by the wireless microphone transmitting device 12, and then the central processing unit 118 sends the digital compressed audio signal to the video transmission unit 110, so that the video transmission unit 110 further processes the digital compressed audio signal to obtain an analog audio signal, and outputs the analog audio signal to the video acquisition device 14. Meanwhile, the video acquisition device 14 performs synchronization on the audio signal input by the audio transmission unit 111 and the acquired video signal to generate a mixed audio and video signal, and outputs the mixed audio and video signal to the video transmission unit 110; the video transmission unit 110 sends the mixed audio and video signal to the central processing unit 118, so that the central processing unit 118 respectively performs compression encoding on the audio signal and the video signal in the mixed audio and video signal to obtain a compression encoded mixture signal, and outputs the compression encoded mixture signal to the WIFI transmission unit 117, so that the compression encoded mixture signal is sent to the video receiving end 15 through the WIFI transmission unit 117. In some embodiments, the central processing unit 118 can be a system on chip (SOC) chip that integrates central processing unit (CPU) and H.264/H.265 codec functions.

Figure 7:
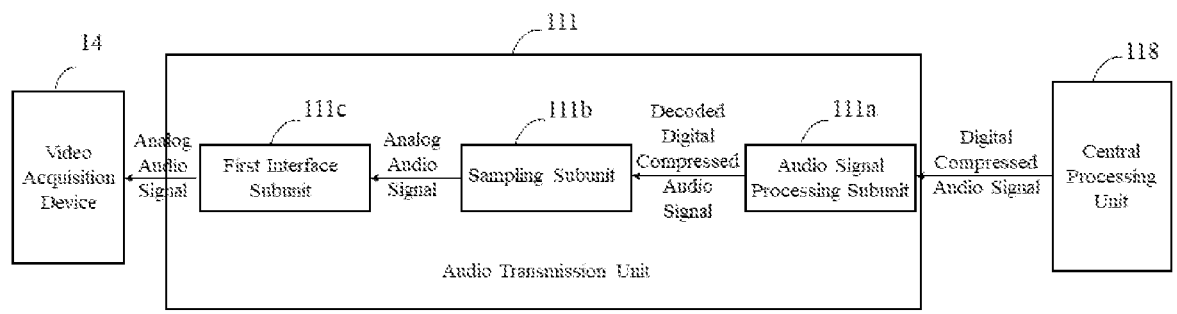
FIG. 7 is a schematic structural diagram illustrating an audio transmission unit according to an embodiment of the present disclosure.

In some embodiments, as shown in FIG. 7, the audio transmission unit 111 can include an audio signal processing subunit 111a, a sampling subunit 111b and a first interface subunit 111c. The audio signal processing subunit 111a is configured to obtain the digital compressed audio signal converted by the central processing unit 118, decode the digital compressed audio signal, and also perform processing such as equalization, sound effect, noise reduction and volume level adjustment on the digital compressed audio signal. The sampling subunit 111b is configured to sample and restore the decoded digital compressed audio signal to obtain an analog audio signal. In some embodiments, the sampling subunit 111b may be a multi-channel audio sampling digital to analog converter (DAC). The first interface subunit 111c is configured to output the analog audio signal obtained by sampling and restoring to the video acquisition device 14, so that the video acquisition device 14 can perform synchronization on the analog audio signal obtained by sampling and restoring and the acquired video signal. The first interface subunit 111c includes a multi-channel amplification processor configured to perform multi-channel audio amplification on the analog audio signal obtained by sampling and restoring to output an analog audio signal whose amplitude meets the level requirement of an input interface of an external microphone of the video acquisition device 14.

Figure 8:
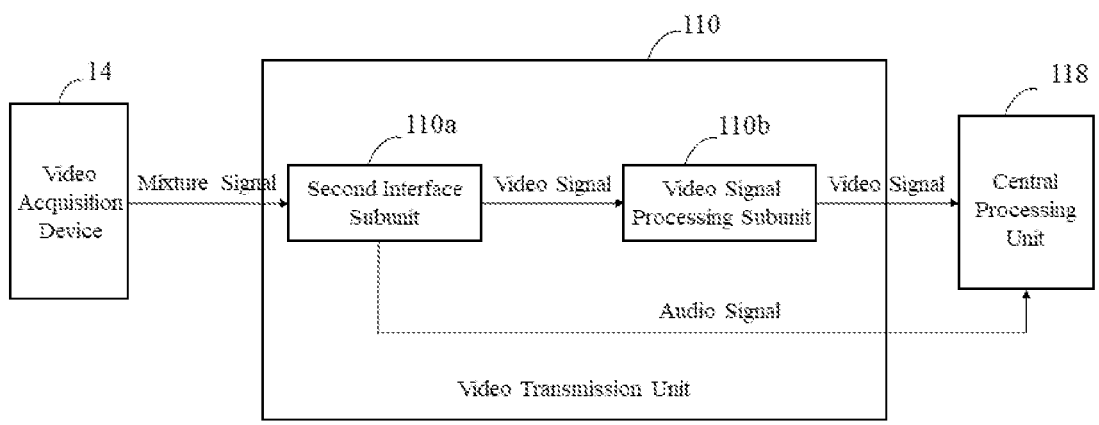
FIG. 8 is a schematic structural diagram illustrating a video transmission unit according to an embodiment of the present disclosure.

In some embodiments, as shown in FIG. 8, the video transmission unit 110 can include a second interface subunit 110a and a video signal processing subunit 110b. The second interface subunit 110a is configured to receive the mixture signal from the video acquisition device 14, separate the audio signal and the video signal from the mixture signal, and transmit the audio signal in the mixture signal to the central processing unit 118 to perform compression encoding on the audio signal. The video signal processing subunit 110b is configured to process and send the video signal to the central processing unit 118 to perform compression encoding on the video signal. In some embodiments, the second interface subunit 110a includes a serial digital interface (SDI) video receiver and a high definition multimedia interface (HDMI) video receiver. The video acquisition device 14 outputs an interface signal conforming to SDI and HDMI standards, wherein the interface signal is a mixture signal including the audio signal and the video signal. The video signal in the mixture signal is converted into a standard digital parallel video signal through the SDI video receiver and the HDMI video receiver, wherein a format of the standard digital parallel video signal is BT1120 or MIPI; and then is sent to the video signal processing subunit 110b, wherein the video signal processing subunit 110b may be an field programmable gate array (FPGA) chip. The FPGA chip selects a video signal and sends the video signal to the central processing unit 118, so that the central processing unit 118 can perform compression encoding on the video signal. The audio signal in the mixture signal is directly output to the central processing unit 118 to perform compression encoding on the audio signal separately from the video signal.

In some embodiments, the audio and video transmission device 11 further includes a camera control unit (CCU) control interface, wherein the central processing unit 118 controls a camera control unit (CCU) of the video acquisition device 14 through the CCU control interface, so as to adjust a lens, image parameters and auxiliary data of the video acquisition device 14.

In some embodiments, the audio and video transmission device 11 further includes an extended interface configured to be connected to the central processing unit 118, wherein the extended interface is configured to be connected to one or more accessories selected from a LCD screen, a key and a power supply. For example, the audio and video transmission device 11 can include the accessories such as a screen, a key and a power supply, and these accessories are connected to the central processing unit 118 through an extended interface, so that the central processing unit 118 can control these accessories.

In some application scenes, after receiving the mixture signal output by the video acquisition device 14, the audio and video transmission device 11 can send the mixture signal to other video receiving ends 15. For example, in the field of film and television shooting or commercial shooting, the mixed audio and video signal acquired by the video acquisition device 14 needs to be sent to the video receiving end 15, so that staffs such as a director and a lighting engineer can make corresponding adjustments according to the effect of the video. In order to facilitate these staffs to view the acquired video, in some embodiments, the audio and video transmission system 10 can further include an application (APP) installed on an electronic device. As the video receiving end 15, the audio and video transmission device 11 can send a mixture signal generated after synchronizing the audio signal and the video signal to the APP, so that a user can view the acquired audio and video through the APP. The electronic device may be a terminal device of the user such as a mobile phone, a tablet and a computer. The user installs a designated APP in the electronic device in advance, and receives the mixture signal generated after synchronizing the audio signal and the video signal from the audio and video transmission device 11 through the APP.

In some embodiments, the audio and video transmission device 11 can be configured to be connected to the wireless microphone transmitting device 12 and the electronic device installed with the APP through WIFI channels, wherein the WIFI transmission unit of the audio and video transmission device 11 is configured to work in an access point (AP) mode, and the WIFI transmission unit of the wireless microphone transmitting device 12 and the electronic device installed with the APP are configured to work in a station (STA) mode. For example, the audio and video transmission device 11 can open a WIFI hotspot, and the wireless microphone transmitting device 12 and the electronic device installed with the APP can search for a service set identifier (SSID) of the audio and video transmission device 11 and establish a WIFI connection with the audio and video transmission device 11 through a preset password. Further, the wireless microphone transmitting device 12 can transmit the audio signal to the audio and video transmission device 11 through an established WIFI connection channel, and the electronic device installed with the APP can receive the mixture signal from the audio and video transmission device 11 through the established WIFI connection channel.

In general, the audio signal of the wireless microphone applied in the field of video shooting requires a very low transmission delay, usually less than 10 ms, and meanwhile has a transmission distance of 50 to hundreds of meters. The reason why the transmission of the audio signal of the wireless microphone has a strict requirement on the delay is that, if the delay is serious, the sound and the image will be out of sync, which will seriously affect the final effect of the video, therefore, it is very important to reduce the delay of the transmission of the audio signal of the wireless microphone. The reasons for the delay of the audio signal transmitted by the wireless microphone 13 mainly include following aspects. First, after the wireless microphone 13 acquires the audio signal of the audio signal source, the wireless microphone transmitting device 12 usually needs to perform compression encoding on the audio signal, and then send the audio signal to the audio and video transmission device 11 through the wireless channel. In general, the audio signal can be encoded frame by frame, therefore, when acquiring the audio signal, acquired audio data will be cached first, and then encoded after a length of the cached audio data reaches one frame. In the process of waiting for the acquired audio data to reach the length of one frame, the wireless microphone transmitting device 12 will also generate a certain delay, which is related to a frame length of the audio data. Second, the process of compressing the audio signal takes a certain amount of time, resulting in a part of the delay. Correspondingly, after receiving the audio signal, the audio and video transmission device 11 needs to decode the audio signal, and the process of the decoding the audio signal will also cause a certain delay. Third, after the encoding is completed, when the audio signal is sent in time slots, there will be a certain air interface time slot delay between the time slots. Fourth, when the audio signal is sent from the wireless microphone transmitting device 12 to the audio and video transmission device 11, there will be a certain transmission and reception delay.

In some embodiments, in order to reduce the delay caused by encoding and decoding the audio signal, when performing compression encoding on the audio signal, a low latency and low loss compression technology can be used to perform compression encoding on the audio signal, wherein the low latency and low loss compression technology may be one of OPUS-CELT, ADPCM, LC3 and LC3plus.

When using the low latency and low loss compression technology such as OPUS-CELT, ADPCM, LC3, LC3plus to compress the audio signal, the frame length of each compressed audio signal can be set by itself, and for an audio signal with a short frame structure, the quality of the compressed audio signal can also be guaranteed. Therefore, in some embodiments, in order to reduce the delay caused by the above-mentioned first aspect, the frame length of the audio signal acquired by the wireless microphone 13 can be configured to be less than a specified length, and the frame length of the audio signal can be as short as possible, for example, less than 2.5 ms, so as to reduce a waiting delay of the audio signal caused by intra-frame caching. Certainly, the specified length can be set according to an actual situation, for example, the specified length can be set to a minimum frame length supported by the above low latency and low loss compression technology.

In some embodiments, since the transmission of the audio signal and the transmission of the mixture signal share a wireless transmission channel, and the requirement of the audio signal on the delay is higher than that of the mixed audio and video signal, in order to reduce the delay of the transmission of the audio signal, a priority of transmitting the audio signal is higher than that of transmitting the mixed audio and video signal, thereby ensuring the priority transmission of the audio signal of the wireless microphone, reducing the transmission and reception delay of the audio signal, and improving the reliability of transmission. Certainly, in addition to transmitting the audio signal, some control instructions will also be transmitted between the wireless microphone transmitting device 12 and the audio and video transmission device 11. Among all kinds of data transmitted by the audio and video transmission device 11, the priority of the transmission of the audio signal can be set to the highest to ensure that the audio signal is transmitted first. For example, both the wireless microphone transmitting device 12 and the audio and video transmission device 11 use a WIFI transmission technology, and the wireless microphone transmitting device 12 and the WIFI transmission unit of the audio and video transmission device 11 can support a WIFI multimedia quality of service (WMM QOS) mechanism, through which the priority of the transmission of respective signals is set.

Since both the audio signal and the mixture signal use the WIFI transmission technology, compared with Bluetooth technology and Zigbee technology, the WIFI transmission technology consumes more power. In the field of video shooting, it is usually necessary to design the wireless microphone 13 and the wireless microphone transmitting device 12 into an integrated form, so that a wireless microphone device has a smaller overall size, lighter weight, and is convenient for the photographed object to wear and install, therefore, the volume of a power supply battery needs to be smaller, and thus a capacity of the power supply battery is smaller. Therefore, how to reduce the power consumption of the wireless microphone transmitting device 12 is also very important.

In some embodiments, the wireless microphone transmitting device 12 uses the WIFI transmission technology to transmit the audio signal to the audio and video transmission device 11, and both the wireless microphone transmitting device 12 and the audio and video transmission device 11 include a WIFI transmission unit. To reduce the power consumption of the wireless microphone transmitting device 12, the WIFI transmission unit of the wireless microphone transmitting device 12 can alternately be configured to work in a sleep state and an awake state. Since the power consumption in the sleep state is relatively low, the WIFI transmission unit of the wireless microphone transmitting device 12 does not have to be in the awake state all the time, thereby reducing the power consumption. For example, in some embodiments, the WIFI transmission unit of the wireless microphone transmitting device 12 switches from the sleep state to the awake state at a preset time interval, and switches from the awake state to the sleep state after completing a transmission task in the awake state. The transmission task may refer to tasks such as sending the audio signal acquired by the wireless microphone 13 to the audio and video transmission device 11 and receiving a control instruction from the audio and video transmission device 11. For example, the WIFI transmission unit of the wireless microphone transmitting device 12 can be awakened from the sleep state every 3 ms. After being awakened, the WIFI transmission unit of the wireless microphone transmitting device 12 first sends the audio signal to the audio and video transmission device 11, receives the control instruction sent by the audio and video transmission device 11, and then enters the sleep state again.

The key to saving the power of the WIFI transmission unit is to reduce the duration of a transmission time slot as much as possible, therefore, the duration of the transmission time slot can be reduced from following aspects. First, a transmission data rate is reduced. For example, using a low latency compression encoding technology to encode the audio signal can reduce the transmission data rate by more than 4 times. Second, an air interface transmission rate is improved. For example, working at a higher modulation and coding scheme (MCS) rate configuration. Third, the duration of a receiving time slot is reduced. For example, since some control instructions sent by the audio and video transmission device 11 to the wireless microphone transmitting device 12 usually have low real-time requirements, when the wireless microphone transmitting device 12 is in the sleep state, the audio and video transmission device 11 can cache these control instructions first, and then send the control instructions to the wireless microphone transmitting device 12 after the wireless microphone transmitting device 12 is awakened, which can reduce the receiving time slot of the wireless microphone transmitting device 12 and save power. For example, the WIFI transmission unit of the audio and video transmission device 11 can use a downlink data packet caching technology in a WMM QOS power saving mechanism, and the audio and video transmission device 11 can send the control instructions (i.e., downlink data packets) sent to the wireless microphone 13 in a trigger mode. When a trigger frame sent by the wireless microphone transmitting device 12 is not received, the audio and video transmission device 11 caches the control instructions; and when the trigger frame is received, it means that the wireless microphone transmitting device 12 is in the awake state, the audio and video transmission device 11 can send the control instructions to the wireless microphone transmitting device 12.

Generally speaking, in order to reduce the power consumption as much as possible, the wireless microphone transmitting device 12 can constantly switch between working states such as a transmitting state, a receiving state, the sleep state and the awake state. It can be seen that the wireless microphone transmitting device 12 has the characteristic of being awakened periodically. Since a real-time requirement of the audio signal is higher, after being awakened, the wireless microphone transmitting device 12 can send the audio signal to the audio and video transmission device 11 immediately. As for the control instructions sent by the audio and video transmission device 11, due to the small amount of data and low real-time requirements, when the wireless microphone transmitting device 12 is in the sleep state, the audio and video transmission device 11 can cache the control instructions and intensively send the control instructions after the wireless microphone transmitting device 12 is awakened. After being awakened, the wireless microphone transmitting device 12 sends the audio signal first, and then receives the control instructions sent by the audio and video transmission device 11. In this way, the power consumption of the wireless microphone transmitting device 12 can be greatly reduced.

In some embodiments, in order to further reduce the power consumption of the wireless microphone transmitting device 12, the WIFI transmission unit of the wireless microphone transmitting device 12 is configured to be a single input single out (SISO) mode, and a single antenna can be used to transmit and receive data, so as to reduce the number of transmitting and receiving channels of the antenna and save power consumption.

In order to further explain the audio and video transmission device and audio and video transmission system provided by the embodiments of the present disclosure, a specific embodiment will be described below.

In scenes such as film and television shooting and commercial video shooting, a video of one or more photographed objects is usually acquired by a photographer through a camera device, and then is sent to staffs such as a director through a wireless transmission technology, so as to remotely monitor the shooting effect. A video signal and one or more audio signals of the one or more photographed objects can be acquired at the same time during shooting. In general, the camera device has a built-in microphone to receive the one or more audio signals of the one or more photographed objects, however, when the one or more photographed objects are far away from the camera device, a sound reception effect of the built-in microphone is relatively poor, which seriously affects the effect of the final acquired audio and video.

Figure 9:
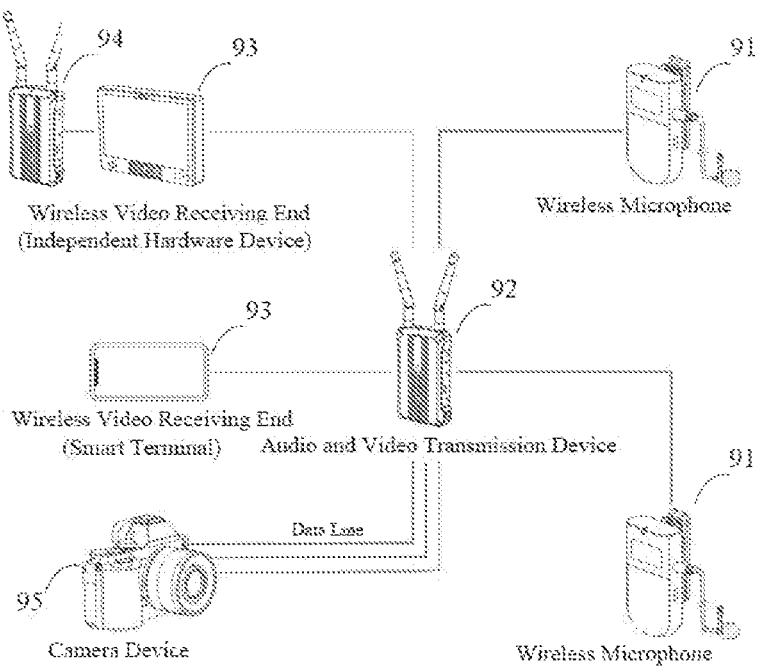
FIG. 9 is a schematic diagram illustrating an audio and video transmission system according to an embodiment of the present disclosure.

An embodiment of the present disclosure provides an audio and video transmission system, which can well solve problems of the acquisition and transmission of the audio signal in a shooting scene where a distance between the photographed object and the camera device is relatively far. As shown in FIG. 9, the audio and video transmission system includes a wireless microphone 91, wherein the number of the wireless microphone 91 is not limited. In FIG. 9, two wireless microphones 91 are taken as an example. The audio and video transmission system further includes an audio and video transmission device 92 and a wireless video receiving end 93, wherein the number of the wireless video receiving end 93 is also not limited. The wireless video receiving end 93 can be a smart terminal with a general WIFI connection function and a general H.264/H.265 video decoding capability, or can also be an independent device with a stronger hardware H.264/H.265 decoding capability and a stronger wireless WIFI performance, wherein the independent device can be connected to a switching station or a monitoring station 94. The wireless microphone 91 can be designed as a whole piece formed by a microphone body and the wireless microphone transmitting device in the above-mentioned embodiment, for example, each of the wireless microphones 91 can be designed as a miniature lavalier type and can be carried by a photographed object, so that the microphone body can reduce the interference of external noise, clearly acquire an audio signal of the photographed object, improve the effect of the acquired audio signal, and send the audio signal to the audio and video transmission device 92 through the wireless microphone transmitting device.

The audio and video transmission device 92 can be installed on a camera device 95 and can be connected to the camera device 95 through a physical interface. The audio and video transmission device 92 is used to receive the audio signal sent by the wireless microphone 91, and input the audio signal to the camera device 95 through the physical interface. The camera device 95 performs synchronous alignment on the audio signal and an acquired video signal to generate a mixture signal obtained by mixing the audio signal and the video signal, and outputs the mixture signal to the audio and video transmission device 92. The audio and video transmission device 92 sends the mixture signal to the wireless video receiving end 93, so that staffs such as a director can view the shot audio and video. The wireless video receiving end 93 can be a device installed with an APP such as a mobile phone, a tablet and a notebook computer, or an independent hardware device, wherein the APP can receive the audio signal and the video signal of the camera device 95 from the audio and video transmission device 92.

The audio signal and the mixture signal can use a WIFI transmission technology, for example, a WIFI IEEE 802.11 transmission technology can be uniformly used, and a WIFI transmission unit that transmits the audio signal and the mixture signal can be configured to work in 2.4 GHz, 5 GHz UNII, or 60 GHz ISM band. The networking mode in the transmission process is that the audio and video transmission device 92 is configured to work in an AP mode, and the wireless microphone 91 and the wireless video receiving end 93 are configured to work in a STA mode.

In order to save wireless channel resources and reduce mutual interference caused by the audio signal and the mixture signal during transmission, the audio signal and the mixture signal can be transmitted by using a same wireless channel in a time division multiplexing manner.

Structures and processing flows of the wireless microphone 91, the audio and video transmission device 92 and the wireless video receiving end 93 are described in detail below.

1. Wireless Microphone 91

Figure 10:
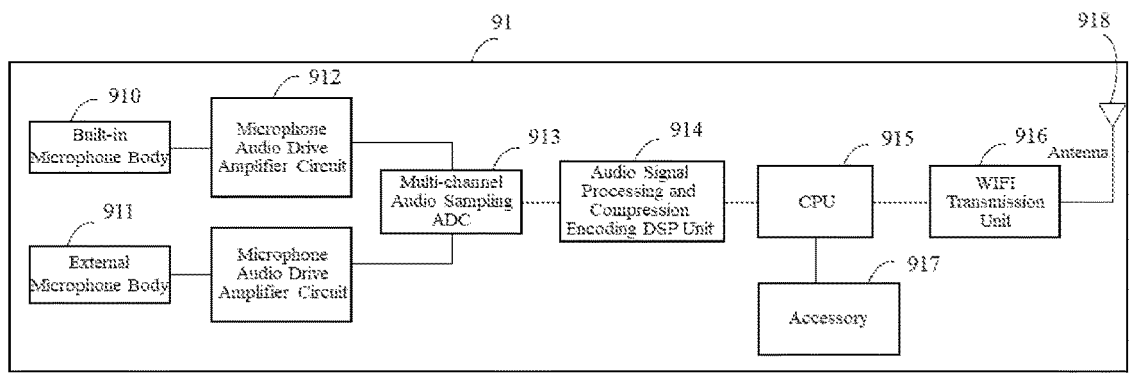
FIG. 10 is a schematic structural diagram illustrating a wireless microphone according to an embodiment of the present disclosure.

The processing flow of the wireless microphone 91 will be described below with reference to a schematic structural diagram of FIG. 10.

The wireless microphone 91 includes a microphone audio drive amplifier circuit 912. The microphone audio drive amplifier circuit 912 is configured to be connected to a microphone body (910 or 911) and is mainly configured to generate and adjust an analog audio signal. The wireless microphone 91 supports the input of a built-in microphone body 910 and an external microphone body 911. When the built-in microphone body 910 and the external microphone body 911 are connected at the same time, the external microphone body 911 can be preferentially selected as the input of a main signal through an impedance change detection of the external microphone body 911 or a digital signal detection of a multi-channel audio sampling analog to digital converter (ADC) 913; and when no external microphone body 911 is connected, a system selects the built-in microphone body 910 as the input of an audio signal by default.

The analog audio signal generated by the microphone audio drive amplifier circuit 912 is input to the multi-channel audio sampling ADC 913, which converts the analog audio signal into a digital original audio signal and has functions of pre-amplification gain adjustment and digital level gain adjustment. The CPU 915 can adjust the input volume of the microphone body by controlling and adjusting the pre-amplification gain or the digital level gain.

The multi-channel audio sampling ADC 913 sends the digital original audio signal to an audio signal processing and compression encoding digital signal processing (DSP) unit 914, which can realize the function of audio signal enhancement processing, for example, the low latency and low loss compression encoding, equalization and noise reduction of the audio signal. To reduce the delay of the transmission of the audio signal, the audio signal can use a low latency and low loss compression encoding technology, for example, one of compression encoding technologies such as OPUS-CELT, ADPCM, LC3 and LC3plus.

The audio signal processing and compression encoding DSP unit 914 sends the compression encoded digital compressed audio signal to a CPU 915, and the CPU 915 runs a TCP/IP protocol stack to complete a conversion from the digital compressed audio signal to an IP data stream, the management of the wireless transmission parameter configuration and the configuration of audio parameters. At the same time, the CPU 915 can also control and manage an accessory 917 such as a key/a LCD screen and a power supply, and a main control work is completed by a built-in firmware.

The CPU 915 transmits the audio signal to a WIFI transmission unit 916, and the WIFI transmission unit 916 transmits the audio signal to the video and audio transmission device 92 through an antenna 918. The WIFI transmission unit 916 is configured to work in a STA mode, maintains a wireless communication connection with the audio and video transmission device 92 working in an AP mode, and mainly realizes functions of a WIFI wireless transmission protocol stack and a wireless transmission link. Further, the WIFI transmission unit 916 can be configured to work in a transmitting-receiving-sleeping-awaking mode alternately, and can support a WIFI WMM QOS mechanism and a WMM power saving function.

In addition, the wireless microphone 91 also includes other accessories 917 such as a key, a LCD screen, a power supply, a housing and installation accessories.

2. Audio and Video Transmission Device 92

Figure 11:
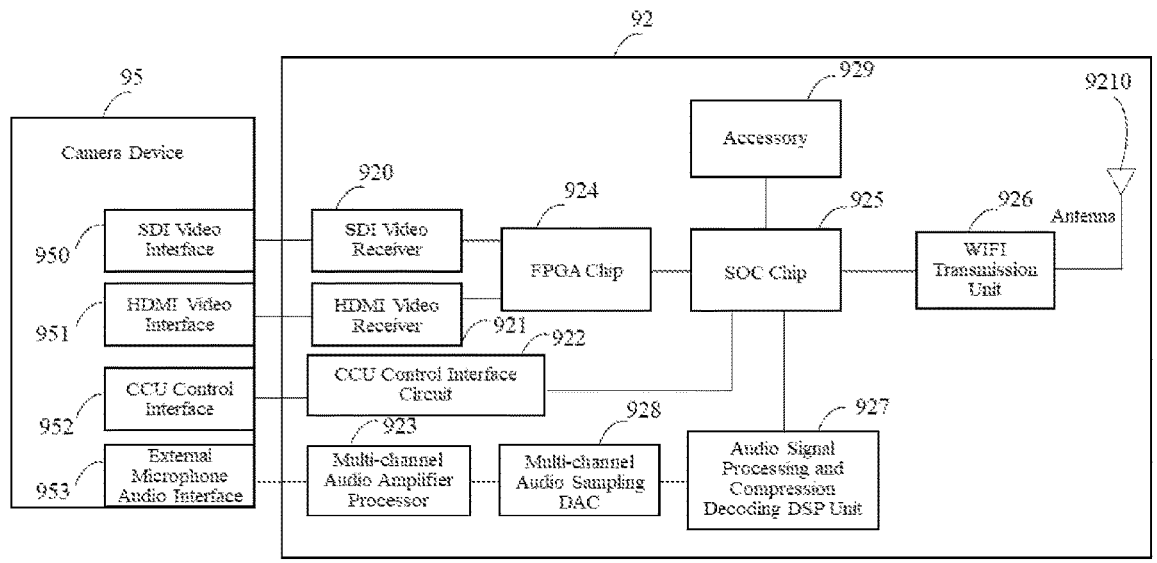
FIG. 11 is a schematic structural diagram illustrating an audio and video transmission device according to an embodiment of the present disclosure.

The working flow of the audio and video transmission device 92 will be described below with reference to a structural schematic diagram of FIG. 11.

The audio and video transmission device 92 includes an interface circuit portion. The interface circuit portion mainly includes a SDI video receiver 920, a HDMI video receiver 921, a CCU control interface circuit 922 and a multi-channel audio amplifier processor 923.

An interface portion of the camera device 95 includes an SDI video interface 950, an HDMI video interface 951, a CCU control interface 952 and an external microphone audio interface 953. The camera device 95 outputs SDI and HDMI standard video interface signals through the SDI video interface 950 and the HDMI video interface 951, and converts the SDI and HDMI standard video interface signals into a standard digital parallel video signal through the SDI video receiver 920 and the HDMI video receiver 921, wherein the format of the standard digital parallel video signal is BT1120 or MIPI. The standard digital parallel video signal is sent to a back end FPGA chip 924, which is mainly used to process the video signal and select a bus. The FPGA chip 924 selects a required video and sends the video to a SOC chip 925, wherein the SOC chip 925 may be a chip that integrates CPU and H.264/H.265 codec functions. The SOC chip 925 performs compression encoding on the video, a dual-channel digital audio signal included in the digital parallel video signal can be directly sent to the SOC chip 925 to perform compression encoding on the audio signal separately from the video signal.

The SOC chip 925 is configured to be connected to a WIFI transmission unit 926, and sends the compressed mixture signal to the WIFI transmission unit 926, so that the WIFI transmission unit 926 sends the compressed mixture signal to the wireless video receiving end 93 through an antenna 9210. Meanwhile, the WIFI transmission unit 926 receives the audio signal sent by the wireless microphone 91, and transmits the audio signal to the SOC chip 925. The WIFI transmission unit 926 of the audio and video transmission device 92 is configured to work in the AP mode, and can be set with an independent SSID. The WIFI transmission unit 926 can be connected to a plurality of wireless microphones 91 and the wireless video receiving end 93 to form a basic service set (BSS) network system unit. The WIFI transmission unit 926 supports a WIFI WMM protocol, a WMM QOS mechanism and a WMM power saving function.

After receiving the audio signal acquired by the wireless microphone sent by the WIFI transmission unit 926, the SOC chip 925 can convert the audio signal into a digital compressed audio signal, wherein the digital compressed audio signal is obtained after encoding by a low latency and low loss audio compression coding algorithm such as ADPCM, Opus-CELT, LC3 and LC3plus, and the format of the digital compressed audio signal is the same as that of the audio signal sent by the wireless microphone. The SOC chip 925 sends the digital compressed audio signal to an audio signal processing and compression decoding DSP unit 927. The audio signal processing and compression decoding DSP unit 927 decodes and outputs the digital compressed audio signal, and also performs processing such as equalization, sound effect, noise reduction and volume level adjustment on the digital compressed audio signal. The audio signal recovered after decoding can be a 48 KHz 16-24 bit high definition audio signal, and the digital audio is converted into an analog audio through the multi-channel audio sampling DAC 928. The multi-channel audio amplifier processor 923 processes the analog audio, and output an analog audio signal whose amplitude meets the level requirement of an external microphone audio interface 953 of the camera device 95.

In addition, the SOC chip 925 is also connected to the CCU control interface 952 of the camera device 95 through the CCU control interface circuit 922 to control the CCU of the camera device 95.

The SOC chip 925 is also connected to an accessory 929 through an extended interface to control the accessory 929. The accessory 929 includes a key, a LCD screen, a power supply, a housing and installation accessories.

3. Wireless Video Receiving End 93

Figure 12:
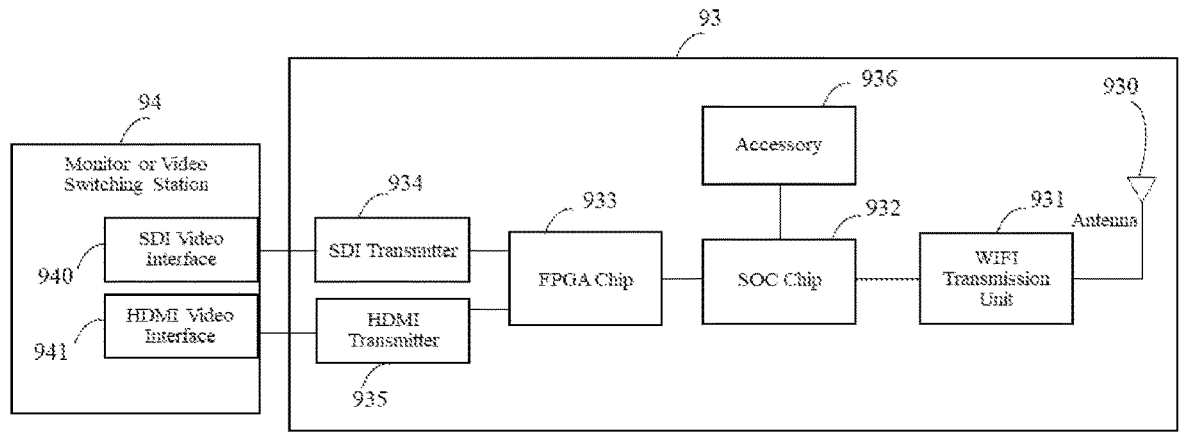
FIG. 12 is a schematic structural diagram illustrating a wireless video receiving end according to an embodiment of the present disclosure.

The wireless video receiving end 93 can be a smart terminal with a general WIFI connection function and a general H.264/H.265 video decoding capability, or can also be an independent device with a stronger hardware H.264/H.265 decoding capability and a stronger wireless WIFI performance. For example, the wireless video receiving end is the independent device, a schematic structural diagram of the wireless video receiving end is shown in FIG. 12, and the working flow of the wireless video receiving end will be described below with reference to the schematic structural diagram.

The wireless video receiving end 93 includes a WIFI transmission unit 931. The WIFI transmission unit 931 receives the mixture signal sent by the audio and video transmission device 92 through an antenna 930. The WIFI transmission unit 931 is configured to work in a STA mode, maintains a wireless communication connection with the audio and video transmission device 92 working in an AP mode, and receives a mixture signal obtained after mixing the audio and the video sent by the audio and video transmission device 92.

After receiving the mixture signal, the WIFI transmission unit 931 sends the mixture signal to a SOC chip 932. The SOC chip 932 can be a chip that integrates CPU and H.264/H.265 codec functions. The SOC chip 932 performs compression decoding on the video signal in the mixture signal, and meanwhile performs decoding on the audio signal; then the SOC chip 932 directly sends the audio signal in the mixture signal to a SDI transmitter 934 and a HDMI transmitter 935, and outputs the video signal in the mixture signal to a FPGA chip 933, wherein the format of the video signal is BT1120 or MIPI, and the FPGA chip 933 is mainly used to process the video signal in the mixture signal and distributes the bus. After completing the digital video signal format conversion, image enhancement, auxiliary data and parallel video bus distribution, the FPGA chip 933 sends the video signal to the SDI transmitter 934 and the HDMI transmitter 935, and the SDI transmitter 934 and the HDMI transmitter 935 transmit the audio signal and video signal to a monitor or a video switching station 94 through a SDI video interface 940 and a HDMI video interface 941 of the monitor or the video switching station 94 connected to the wireless video receiving end 93.

The wireless video receiving end 93 further includes an accessory 936 configured to be connected to and controlled by the SOC chip 932, wherein the accessory 936 includes a key, a LCD screen, a power supply, a housing and installation accessories.

According to the audio and video transmission system provided by the embodiment of the present disclosure, when performing low latency compression encoding on the audio signal, setting the priority of the transmission of the audio signal to be higher than that of the mixture signal, using the short frame structure for the audio signal to reduce the delay of the transmission of the audio signal, the delay of the audio signal is as follows:

when T0 is a compression encoding delay of a low latency audio signal, the delay is less than 0.5 ms;
when T1 is a cache delay before encoding the data frame of the audio signal, the delay is related to a length of the data frame, and the minimum delay is 2.5 ms;
when T2 is a transmission and reception delay of the audio signal, the delay is less than 1 ms;
when T3 is a length of an air interface transmission time slot, the delay is less than 0.5 ms; and
when T4 is a decoding delay of the audio signal, the delay is less than 0.5 ms.

Finally, a total delay of the transmission of the audio signal is T0+T1+T2+T3+T4, which can basically achieve a goal of less than 5 ms.

In addition, according to the audio and video transmission system provided by the embodiment of the present disclosure, by using the low latency compression encoding technology for the audio signal, using the single input single out mode for the wireless microphone 91, using the transmitting-receiving-sleeping-awaking mode for the WIFI transmission unit of the wireless microphone, caching the control instructions sent to the wireless microphone 91 by the audio and video transmission device 92, and then intensively sending the control instructions after the wireless microphone 91 is awakened, the power consumption of the wireless microphone 91 can be greatly reduced. When the WIFI transmission unit of the wireless microphone 91 is configured to work in the sleep state, power consumption current of the wireless microphone 91 can be as low as about 20 uA; and when the wireless microphone 91 is awakened, current of the wireless microphone 91 gradually increases, and the maximum current of the transmission time slot can reach 200 mA. Then, the wireless microphone 91 goes into the receiving state, the current of the wireless microphone 91 drops to 80 mA, and the power consumption of the wireless microphone 91 is obviously reduced.

As can be seen from the above description, the audio and video transmission system provided by the embodiment of the present disclosure may have following advantages.

(1) The audio signal of the photographed object is acquired by the wireless microphone 91 physically separated from the camera device 95. Compared with the microphone built in the camera device 95, the quality of the audio signal can be improved, and the audio signal and the mixture signal can be simultaneously transmitted by the audio and video transmission device 92, which is convenient for installation.

(2) Both the audio signal and the mixture signal can use the wireless transmission technology. The audio and video transmission device 92 uses the same wireless transmission channel to transmit the audio signal and the mixture signal in the time division multiplexing manner, thereby saving channel resources and avoiding interference caused by the transmission of the two signals. The transmission solution can not only take into account the characteristics of small bandwidth occupation, low power consumption and low delay parameters of the audio signal acquired by wireless microphones, but also ensure the requirement of the high transmission bandwidth for the wireless video signal, therefore, respective requirements of audio and video transmission services can be met.

(3) Since the audio signal has a higher requirement for real-time performance, the priority of the transmission of the audio signal can be set higher than that of the mixture signal through the WMM QOS mechanism, thereby reducing the delay of the audio signal.

(4) By performing low latency and low loss compression on the audio signal, the delay of the transmission of the audio signal can be reduced.

(5) The audio signal can use the short frame structure, and the WIFI transmission unit of the wireless microphone 91 is configured to be the single input single out mode. The wireless microphone transmitting device can alternately switch between various working modes of transmitting-receiving-sleeping-awaking. For the audio signal with the high real-time requirement, the audio signal can be transmitted immediately after being awaked; and for the control instructions with a relatively small data volume and a relatively low real-time requirement, the control instructions can be cached by the audio and video transmission device 92 when the wireless microphone 91 is in the sleep state, and then are intensively sent after the wireless microphone 91 is awakened. In this way, the power consumption of the wireless microphone 91 can be greatly reduced.

The various technical features in the above embodiments can be combined arbitrarily, as long as there is no conflict or contradiction between the combinations of features. Due to space limitations, the combinations of features are not described one by one. Therefore, the various technical features in the above embodiments combined arbitrarily also belong to the scope of the present disclosure.

Those skilled in the art will easily think of other embodiments of the present disclosure after considering the specification and practicing the present disclosure disclosed herein. The present disclosure is intended to cover any variations, uses, or adaptive changes of the present disclosure. These variations, uses, or adaptive changes follow the general principles of the present disclosure and include common knowledge or conventional technical means in the technical field that are not disclosed in the present disclosure. The description and the embodiments are to be regarded as being exemplary only, and the true scope and spirit of the present disclosure are specified by the following claims.

It will be appreciated that the present disclosure is not limited to the exact construction that has been described above and illustrated in the accompanying drawings, and that various modifications and changes can be made without departing from the scope thereof. It is intended that the scope of the present disclosure shall only be limited by the appended claims.

The above are only the embodiments of the present disclosure and are not used to limit the present disclosure. Any modification, equivalent replacement, improvement, etc. made within the spirit and principle of the present disclosure may be included in the protection scope of the present disclosure.

The invention claimed is:

1. An audio and video transmission system, comprising: an audio and video transmission device; and
at least one wireless microphone transmitting device, wherein each of the at least one wireless microphone transmitting device is configured to send an audio signal acquired by a wireless microphone to the audio and video transmission device,
wherein the audio and video transmission device is configured to be respectively connected to the wireless microphone transmitting device and a video acquisition device that is external to the audio and video transmission device, and
wherein the audio and video transmission device is configured to:
receive the audio signal from the wireless microphone transmitting device,
transmit the audio signal to the video acquisition device,
obtain a mixture signal generated by the video acquisition device from the audio signal and a video signal, and
process and output the mixture signal
wherein the audio and video transmission device is configured to transmit the audio signal and the mixture signal through a same wireless channel in a time division multiplexing manner, and
wherein a priority of transmitting the audio signal is higher than a priority of transmitting the mixture signal.

2. The audio and video transmission system according to claim 1, wherein the wireless microphone transmitting device is configured to:
before sending the audio signal to the audio and video transmission device, compress the audio signal through a low latency and low loss compression technology,
wherein the low latency and low loss compression technology comprises at least one of OPUS-CELT, ADPCM, LC3, or LC3plus, and wherein a frame length of the audio signal is configured to be less than a specified length.

3. The audio and video transmission system according to claim 1, further comprising an application (APP) installed on an electronic device that is external to the audio and video transmission device,
wherein the mixture signal processed by the audio and video transmission device is sent to the APP, such that the APP decodes and displays the processed mixture signal.

4. The audio and video transmission system according to claim 3, wherein at least one of the wireless microphone transmitting device or the audio and video transmission device comprise a WIFI transmission unit, and the audio and video transmission device is configured to be connected to the wireless microphone transmitting device and the electronic device through WIFI channels, and
wherein the audio and video transmission device is configured to work in an access point (AP) mode, and the wireless microphone transmitting device and the electronic device is configured to work in a station (STA) mode.

5. The audio and video transmission system according to claim 4, wherein the wireless microphone transmitting device comprises the WIFI transmission unit, and wherein a working state of the WIFI transmission unit of the wireless microphone transmitting device is alternately switched between a sleep state and an awake state.

6. The audio and video transmission system according to claim 5, wherein the WIFI transmission unit of the wireless microphone transmitting device is configured to:
switch from the sleep state to the awake state at a preset time interval, and switch from the awake state to the sleep state after completing a transmission task in the awake state, and wherein the transmission task comprises:
sending the audio signal to the audio and video transmission device and
receiving a control instruction from the audio and video transmission device.

7. The audio and video transmission system according to claim 6, wherein the audio and video transmission device is configured to cache the control instruction when the working state of the WIFI transmission unit of the wireless microphone transmitting device is the sleep state.

8. The audio and video transmission system according to claim 4, wherein the WIFI transmission unit is configured to be in a single input single out (SISO) mode.

9. An audio and video transmission device, comprising:
at least one processor; and
at least one memory coupled to the at least one processor and storing programming instructions for execution by the at least one processor to perform operations comprising:
receiving an audio signal acquired by a wireless microphone from a wireless microphone transmitting device;
transmitting the audio signal to an external video acquisition device;
obtaining a mixture signal generated by the video acquisition device from the audio signal and a video signal; and
processing and outputting the mixture signal,
wherein the operations comprise:
transmitting the audio signal and the mixture signal through a same wireless channel in a time division multiplexing manner,
wherein a priority of transmitting the audio signal is higher than that of transmitting the mixture signal.

10. The audio and video transmission device according to claim 9, wherein the audio signal comprises a compressed audio signal that is compressed through a low latency and low loss compression technology by the wireless microphone transmitting device, and
wherein the low latency and low loss compression technology comprises one of OPUS-CELT, ADPCM, LC3 and LC3plus, and a frame length of the compressed audio signal is less than a specified length.

11. The audio and video transmission device according to claim 9, wherein the operations comprise:
receiving the audio signal from the wireless microphone transmitting device through WIFI transmission; and
outputting the mixture signal through the WIFI transmission.

12. The audio and video transmission device according to claim 11, wherein the operations comprise:
converting the audio signal sent by the wireless microphone transmitting device through the WIFI transmission into a digital compressed audio signal;
respectively performing compression encoding on the audio signal in the mixture signal and the video signal in the mixture signal to obtain a compression encoded audio signal and a compression encoded video signal; and
outputting the compression encoded audio signal and the compression encoded video signal through the WIFI transmission.

13. The audio and video transmission device according to claim 12, wherein the operations comprise:
decoding the digital compressed audio signal to obtain a decoded digital compressed audio signal;
sampling and restoring the decoded digital compressed audio signal to obtain an analog audio signal; and
outputting the analog audio signal to the video acquisition device.

14. The audio and video transmission device according to claim 12, wherein the operations comprise:
receiving the mixture signal from the video acquisition device;
separating the audio signal and the video signal from the mixture signal;
processing the video signal to obtain a processed video signal; and
performing compression encoding on the processed video signal.

15. The audio and video transmission device according to claim 12, further comprising a camera control unit (CCU) control interface,
wherein the operations comprise:
controlling a camera control unit (CCU) of the video acquisition device through the CCU control interface.

16. The audio and video transmission device according to claim 12, further comprising an extended interface,
wherein the operations comprise:
controlling one or more accessories selected from a Liquid Crystal Display (LCD) screen, a key and a power supply through the extended interface.

* * * * *